No. 627,911. Patented June 27, 1899.
H. V. ESTILL.
METER BOX AND METER CONNECTION THEREWITH.
(Application filed Mar. 30, 1899.)
(No Model.) 2 Sheets—Sheet 1.
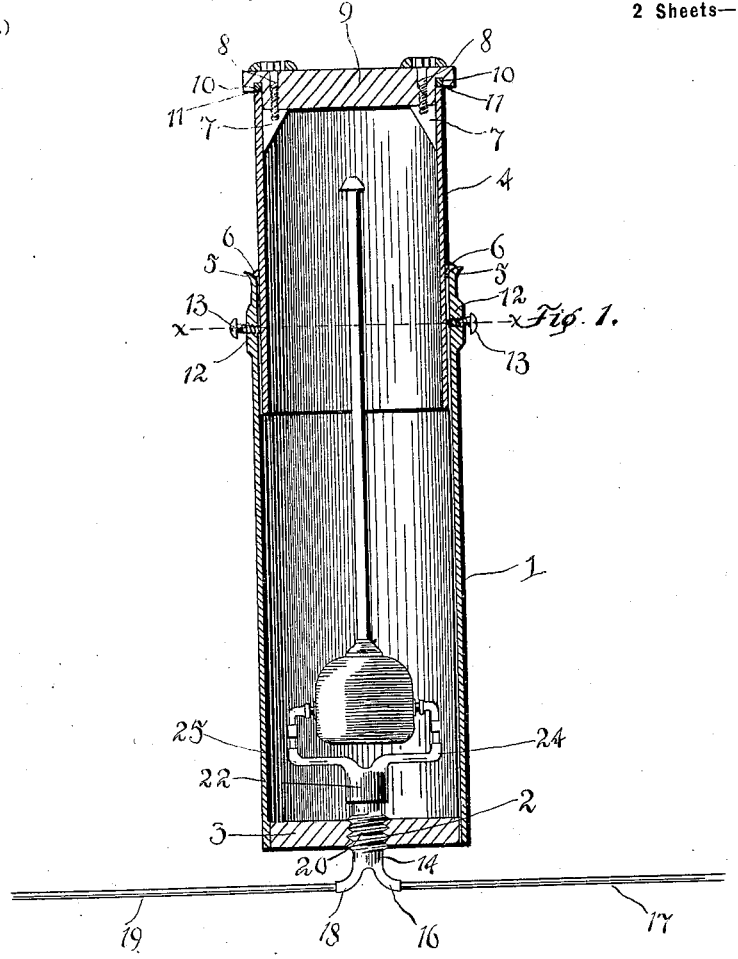
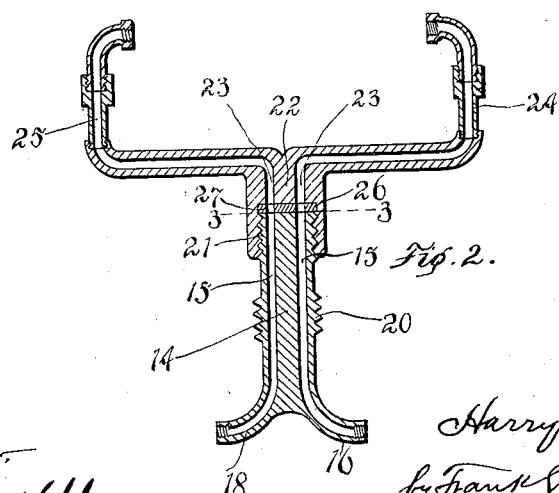
Witnesses
F. H. Rittenour
Milton Boyd Jehly
Inventor
Harry V. Estill
by Frank J. Appleman
Attorney No. 627,911. Patented June 27, 1899.
H. V. ESTILL.
METER BOX AND METER CONNECTION THEREWITH.
(Application filed Mar. 30, 1899.)
(No Model.) 2 Sheets—Sheet 2.
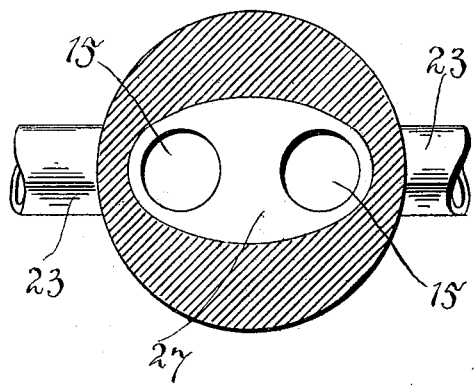
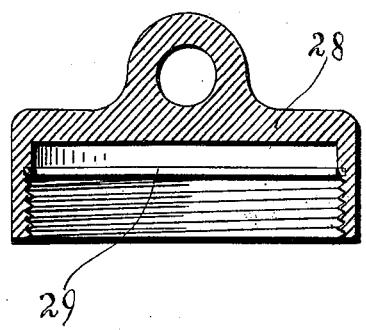
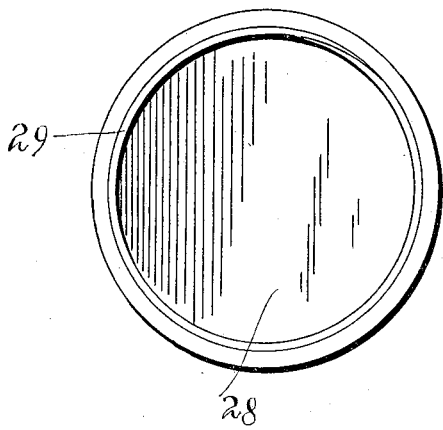
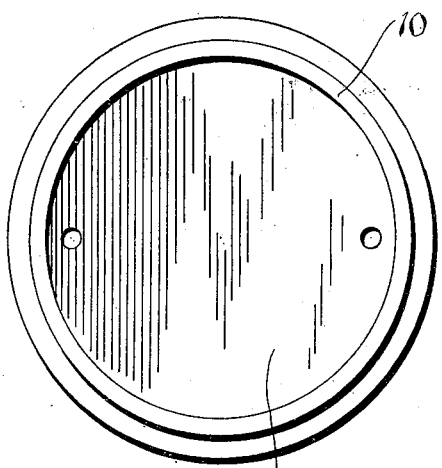
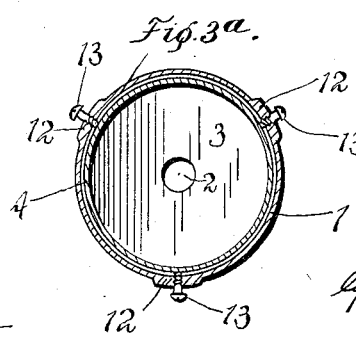
Witnesses
Inventor
Harry V. Estill
Attorney

UNITED STATES PATENT OFFICE.

HARRY V. ESTILL, OF MOBERLY, MISSOURI.

METER-BOX AND METER CONNECTION THEREWITH.

SPECIFICATION forming part of Letters Patent No. 627,911, dated June 27, 1899.

Application filed March 30, 1899. Serial No. 711,089. (No model.)

*To all whom it may concern:*

Be it known that I, HARRY V. ESTILL, a citizen of the United States of America, residing at Moberly, in the county of Randolph and State of Missouri, have invented certain new and useful Improvements in Meter-Boxes and Meter Connections Therewith, of which the following is a specification, reference being had therein to the accompanying drawings.

This invention relates to improvements in meter-boxes, and particularly to that class designed for use in incasing water-meters.

The objects of the invention are, first, to provide a connection by which the meter may be applied and removed through a single threaded connection; second, to provide a novel means whereby the supply and service pipes may be connected and used even though the meter is dispensed with, and, third, to produce a novel telescopic casing or box for accommodating meters stationed at varying depths and also in so forming the parts that the joint of the sections may be calked and rendered waterproof.

A still further object of the invention is to produce a meter-box which will possess advantages in points of simplicity, durability, and efficiency in order that the cost of manufacturing the box and the elements coöperating with it may be comparatively small.

With the above and other objects in view the invention consists in the details of construction and in the arrangement and combinations of parts to be hereinafter more fully set forth and specifically claimed.

In describing the invention in detail reference will be had to the accompanying drawings, forming part of this specification, wherein like characters denote corresponding parts in the several views, and in which—

Figure 1 is a vertical central sectional view of the box with the meter and its connections shown in elevation. Fig. 2 is a sectional view of the connecting-pipes for the meter. Fig. 3 is a sectional view on the line 3 3 of Fig. 2. Fig. 3ª is a section on the line $x$ $x$ of Fig. 1. Fig. 4 is a sectional view of a cap for use when the meter is removed. Fig. 5 is a plan view of the under side of the cap. Fig. 6 is an enlarged plan view of the under side of the cover.

In the drawings, 1 indicates the lower section of the box, having a central aperture 2 in its bottom 3. This aperture is threaded for the purpose to be hereinafter explained. The upper section 4 of the box is slidable, fitting in the lower section, and the upper edge of said lower section is flared, as at 5, to receive the calking 6, that the joint may be rendered water-tight. At the top of the upper section are internal lugs 7, threaded to receive the bolts 8 for binding the cover 9 in place. The cover has an annular groove 10, corresponding with the upper edge of the upper section, and after the gasket 11 has been embedded in the groove the cover is applied to the upper section, with the edge thereof in contact with the gasket. Hence as the bolts draw the cover down a water-tight joint is formed. Near the top of the lower section the wall is given an increased thickness at predetermined points—as, for instance, at 12 12 12. These thickened portions are apertured and threaded to receive the binding-screws 13, which engage the outer wall of the upper section when the said upper section has been adjusted to the desired height. Of course the calking will not be applied until the sections have been adjusted and secured, as heretofore set forth. Threaded in the aperture in the bottom of the lower section of the casing is a pipe 14, having two ways 15 therein, one of which connects with the branch 16 and the supply-pipe 17 and the other way or passage connecting with the branch 18 and the service-pipe 19.

The pipe 14 has an external threaded portion 20, which engages the threads in the bottom of the casing, and at the upper end of the double pipe are other threads 21, to which is coupled the meter connection 22.

The meter connection 22 is formed with two passages 23 23, one connecting with the supply-passage and one connecting with the service-passage of the double pipe. The branch pipes 24 and 25 are joined with the meter from opposite sides. The lower end of the meter connection has an elliptical recess 26, in which a gasket 27 is fitted, and the gasket has holes connecting with the passages in the meter connection. By having the gasket fitted as shown the holes will always connect with the passages, since it is impossible for the gasket to be turned when the parts are being assembled.

As will be seen from the drawings, Fig. 1, it is only necessary to unscrew the meter connection from the double pipe, when the meter may be removed, and of course the meter can be applied in like simple manner from the surface of the ground in which the meter is embedded.

In order that the water-supply may not be permanently interrupted when the meter is removed, a cap 28 is run on the threads of the double pipe, and the gasket 29 of the cap prevents leakage. The head of the cap above the threads is hollow and forms a channel for the passage of water from the supply to the service pipe.

It is my purpose to have the threads 21 and the threads of the meter connection engaging therewith very fine, that a half-turn, more or less, may be made after the parts are in contact for the purpose of causing the passages to connect.

The construction, operation, and advantages will, it is thought, be understood from the foregoing description, and it will be noted that various changes may be made in the proportion and other details of construction without departing from the spirit of the invention.

Having thus fully described my invention, what I claim as new, and desire to secure by Letters Patent, is—

1. In a device of the character described, a meter-casing consisting of an upper and lower telescopic section, means for binding the sections together, a cover for the upper section, a double pipe threaded in the bottom of the casing, branches connecting the double pipe and meter, and supply and service pipes, substantially as described.

2. In a device of the character described, a meter-casing consisting of an upper and lower telescopic section, means for securing the sections together, the upper end of the lower section being flared and provided with calking, substantially as described.

3. In a device of the character described, a casing comprising two telescopic sections, the lower section having a bottom provided with a central threaded aperture, a double pipe threaded in the bottom and projecting within the casing, a meter connection, a gasket fitting in an elliptical opening in the meter connection, and having holes adapted to connect with the double pipe and meter connection, substantially as described.

4. In combination with a double pipe for a meter connection, a cap adapted to form a connection between the passages of the pipe when the meter is removed, substantially as described.

5. In combination, an upper and lower telescopic section forming a meter-casing, the lower section having a flared upper end, calking lying between the flared end and the upper section, and a cover for the casing fitted to exclude water, substantially as described.

6. In combination with a meter, a double pipe, a meter connection fitting on the double pipe and having branches communicating with the opposite sides of the meter, substantially as described.

7. In combination with a meter and its connections, a double pipe to which the meter connection is threaded, substantially as described.

In testimony whereof I affix my signature in the presence of two witnesses.

HARRY V. ESTILL.

Witnesses:
 H. A. MARTIN,
 W. A. MARTIN.